3,787,444
DIBENZO[b,f]THIEPIN-10-CARBOXYLIC ACIDS
Jacques Gosteli, Basel, Switzerland, assignor to Ciba-Geigy Corporation
No Drawing. Filed Dec. 30, 1971, Ser. No. 214,475
Claims priority, application Switzerland, Jan. 8, 1971, 243/71
Int. Cl. A61k 27/00; C07d 67/00
U.S. Cl. 260—327 B   3 Claims

ABSTRACT OF THE DISCLOSURE

A new process for the production of N-substituted dibenzo[b,f]thiepin-10-methylamines and closely related compounds is provided, which process consists essentially in reducing corresponding amides of dibenzo[b,f]thiepin-10-carboxylic acids with complex hydrides. Further are provided processes for the production of dibenzo[b,f]thiepin-10-carboxylic acids used for the preparation of said amides. The dibenzo[b,f]thiepin-10-carboxylic acids are novel compounds which also possess pharmacological, particularly anti-inflammatory properties and are active ingredients for pharmaceutical compositions. A typical embodiment is the condensation of O-(phenylthio)-benzaldehyde with hippuric acid, which leads with or without isolation of intermediates to dibenzo[b,f]thiepin-10-carboxylic acid, conversion thereof into its chloride, reaction of the latter with dimethylamine and reduction of the dimethylamide obtained with lithium aluminium hydride in the presence of an ethereal solvent to N,N-dimethyl-dibenzo[b,f]thiepin-10-methylamine.

DETAILED DESCRIPTION

The present invention relates to a process for the production of N-substituted dibenzo[b,f]thiepin-10-methyl-amines, to appertaining new intermediates as well as to processes for the production of them.

Compounds of the General Formula I:

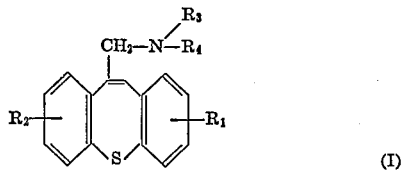

wherein $R_2$ and $R_2$ represent hydrogen, chlorine, bromine, trifluoromethyl or lower alkyl, alkoxy or alkylthio groups,
$R_3$ represents hydrogen or a lower alkyl group,
$R_4$ represents hydrogen or a lower alkyl group, or
$R_3$ and $R_4$ together with the adjacent nitrogen atom represent a polymethyleneimino group having 5 to 7 ring-members, the morpholino group, or a 4-lower-alkyl-1-piperazinyl or 4-lower-alkyl-hexahydro-1H-1,4-diazepin-1-yl group, and their addition salts with inorganic and organic acids possess valuable pharmacological properties. They have an adrenolytic and, in particular, a central-depressant action, such as, e.g. anaesthetic-potentiating and sedative activity. They can be administered orally or, in the form of aqueous solutions of their pharmaceutically acceptable salts, also parenterally, e.g. for the treatment of states of tension and agitation.

In the compounds of the General Formula I, and in the appertaining, below mentioned intermediates, $R_1$ and $R_2$ are preferably in the 2- or 3- and 7- or 8-position, respectively whereby the 8-position is of particular importance. As lower alkyl, alkoxyl or alkylthio groups, $R_1$ and $R_2$ are, independently of each other, preferably methyl, methoxy or methylthio groups; also suitable as $R_1$ and $R_2$ are ethyl, propyl, isopropyl, butyl, isobutyl or tert.butyl groups, or ethoxy, propoxy, isopropoxy, butoxy, isobutoxy groups, or ethylthio, propylthio, isopropythio or butylthio groups. Of special significance are compounds of the General Formula I having hydrogen as $R_1$, and hydrogen or the methoxy group in the 8-position as $R_2$. As lower alkyl groups, $R_3$ and $R_4$ are, in particular, methyl groups, also, e.g. ethyl, n-propyl, isopropyl, butyl or isobutyl groups. $R_3$ and $R_4$ form, together with the adjacent nitrogen atom, e.g. the 1-pyrrolidinyl, piperidino, hexahydro-1-azepinyl, morpholino, 4-methyl-1-piperazinyl or 4-methyl-hexahydro-1H-1,4-diazepin-1-yl group.

Two processes have hitherto been available for the production of the compounds of the General Formula I. In the case of the first known process, a reactive ester of a dibenzo[b,f]thiepin-10-methanol of the General Formula IX:

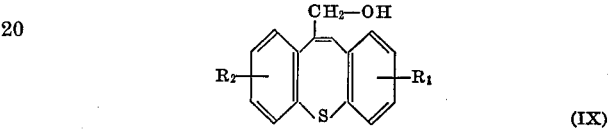

wherein $R_1$ and $R_2$ have the meanings given under Formula I, e.g. a sulphonic acid ester or a halide, especially bromide, is reacted with a compound of the General Formula IV:

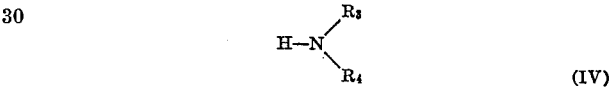

wherein $R_3$ and $R_4$ have the meanings given under Formula I.

In the case of the second known process, a dibromine compound of the General Formula XI:

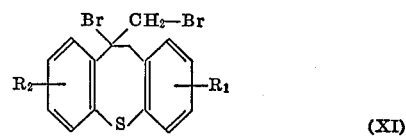

wherein $R_1$ and $R_2$ have the meanings given under Formula I is reacted with at least the double-molar amount of a compound of the above given Formula IV wherein $R_3$ and $R_4$ have the meanings given under Formula I; and in the process of this reaction there occurs, simultaneously with the replacement of the bromine atom in the methyl group by the amino group, the elimination of hydrobromic acid.

The direct starting materials for both processes are produced starting with the same initial products: the ketones of the General Formula VI:

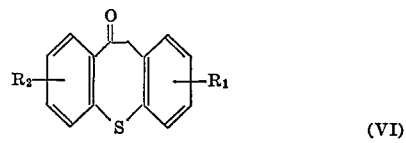

wherein $R_1$ and $R_2$ have the meanings given under Formula I. For their part, these ketones can be produced, by ring closure, from [o-(phenylthio)-phenyl]-acetic acids substituted corresponding to the definition for $R_1$ and $R_2$.

Starting materials for the first known process leading to compounds of the General Formula I are produced by the reaction initially of the ketones of the General Formula VI with metal-organic methyl compounds, e.g. with methyl magnesium halides according to Grignard, in a mixture of diethyl ether and benzene, or in tetrahydrofuran, to give compounds of the General Formula VII:

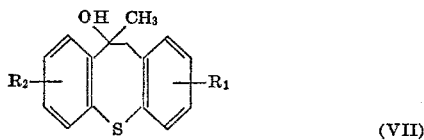

(VII)

wherein $R_1$ and $R_2$ have the meanings given under Formula I; the conversion of these compounds by water-elimination, e.g. by boiling with dilute hydrochloric acid, into compounds of the General Formula VIII:

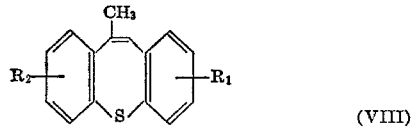

(VIII)

wherein $R_1$ and $R_2$ have the meanings given under Formula I; and halogenation of these compounds in their methyl group in the 10- or 11-position by means of an organic N-halogen compound, e.g. bromination by means of N-bromosuccinimide; and, optionally, replacement of the halogen atom by a sulphonyloxy radical, e.g. by the p-toluenesulphonyloxy radical.

A variant of the process for production of the direct starting materials, the reactive esters of compounds of the General Formula IX, consists in the conversion of a ketone of the General Formula VI, e.g., with sodium amide, into its sodium compound, and the reaction of this with methyl iodide, whereupon the methylene group situated adjacent to the keto group is substituted by a methyl group. The keto group is then reduced, e.g., with lithium aluminium hydride in ether, to the hydroxyl group, and this replaced, by means of thionyl chloride, by a chlorine atom. By the reaction of the obtained chlorine compound with a strong base, e.g., by boiling with potassium-tert.butylate in abs. toluene, there is finally obtained, with the elimination of hydrochloric acid, a 10- or 11-methyl-dibenzo[b,f]thiepin of the General Formula VIII, in which a substituent $R_1$ of the ketone of the General Formula VI is now in the ring substituted by $R_2$ and, vice versa, a substituent $R_2$ in the place of $R_1$.

Starting materials for the second known process are obtained by the water elimination in the hydroxy compounds of the above General Formula VII being carried out under the carefullest possible conditions, e.g., the boiling with 0.2 N hydrochloric acid, so that the direct reaction product contains the largest possible proportion of the methylene compound of the General Formula X:

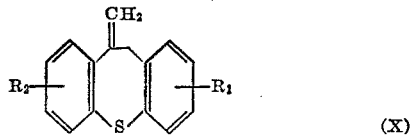

(X)

wherein $R_1$ and $R_2$ have the meanings given under Formula I, in addition to a certain proportion of the compound of the above given General Formula VIII. By the addition of bromine there is formed, from the compound of the General Formula X, the direct starting material of the General Formula XI, whilst the isomer of the General Formula VIII does not react under the same conditions and is preferably separated as a neutral substance after the subsequent reaction of the crude bromine addition product with an amine of the General Formula IV.

The production of the direct starting materials for both known processes entails a Grignard reaction: the reaction of a ketone of the General Formula VI with a methyl magnesium halide. The 10-methyl-dibenzo[b,f]thiepins of the General Formula VIII which are required as initial products for the first known process can be produced from the ketones of the General Formula VI indeed also by another reaction sequence, but this sequence is less advantageous than the Grignard reaction, not only because of the greater number of reaction steps, but, in particular, also because of the resulting formation of an appreciable proportion of O-methylation product (enol ether) in the first reaction stage.

It has now been found that the compounds of the General Formula I can be produced in a commercially advantageous manner by the reduction, by means of a complex hydride, of an amide of the General Formula V:

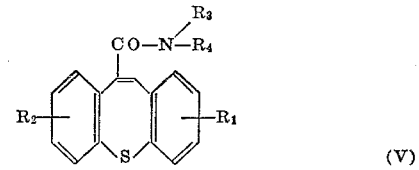

(V)

wherein $R_1$, $R_2$ and $R_3$ have the meanings given under Formula I. Suitable as a complex hydride is, in particular, lithium aluminium hydride in the presence of an ethereal solvent; it is also possible, however, to employ other complex hydrides, such as, e.g., sodium-bis-(2-methoxyethoxy)-aluminium hydride, or diborane. Applicable as a solvent for reductions with lithium aluminium hydride is, e.g., a mixture of diethyl ether and benzene, or tetrahydrofuran on its own or mixed with benzene, also dioxane, ethylene glycol dimethyl ether, dipropyl ether, dibutyl ether, without or with the addition of benzene. Reductions with diborane can be performed in the same solvents, whilst reductions with sodium-bis-(2-methoxyethoxy)-aluminium hydride are preferably carried out in benzene. The reaction temperatures are, e.g., between 0° and 80° C., or the boiling temperature of the reaction medium if this should be lower. According to an advantageous embodiment of the reduction with lithium aluminium hydride, an addition dropwise is made to a suspension of the last-mentioned in ether, whilst this suspension is being refluxed, of a benzene solution of the amide of the General Formula V, refluxing of the reaction mixture being continued for a short time, preferably for 10 to 30 minutes, after completion of the dropwise addition.

The amides of the General Formula V required as starting materials are new substances which are produced by the reaction of a carboxylic acid of the General Formula III:

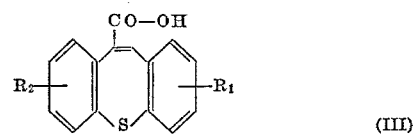

(III)

wherein $R_1$ and $R_2$ have the meanings given under Formula I, or of a reactive functional derivative thereof, with a compound of the already mentioned General Formula IV:

(IV)

wherein $R_3$ and $R_4$ have the meanings given under Formula I. For example, an acid of the General Formula III is heated with an amine of the General Formula IV in the presence of a condensation agent, such as phosphorus trichloride, in an inert organic solvent, such as, e.g. benzene, dioxane or pyridine, to temperatures of between 80° and 115° C. or the boiling point of the reaction medium. Instead of the carboxylic acid of the General Formula III being reacted direct with the amine of the General Formula IV, it can be initially converted in a manner known per se, e.g. into a reactive functional derivative, e.g. into a lower alkyl ester, into the p-nitrophenyl ester or the cyanomethyl ester, into its anhydride or a mixed anhydride, e.g. one with a carbonic acid monoalkyl ester, or into an acid halide; and such functional derivatives reacted with compounds of the General Formula IV. Preferably used are, for example, the carboxylic acid chlorides produced with excess thionyl chloride.

The carboxylic acids of the General Formula III are, for their part, new compounds. In order to take advantage of the above new process, it was therefore further necessary to develop one or more commercially advantageous processes for the production of the novel starting materials of Formula V.

According to one process of which there are several possible variants, the carboxylic acids of the General Formula III are produced by the reaction of a compound of the General Formula II:

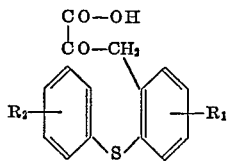

(II)

wherein $R_1$ and $R_2$ have the meanings given under the General Formula I, or a compound convertible into the compound of the General Formula II by acid hydrolysis and, optionally, decarboxylation, with an acid condensation agent. Preferably, the ring closure according to the process is performed in a mixture of concentrated sulphuric acid and water in a volume ratio of 1:1 to 2:1 at the boiling temperature of the mixture, the duration of the reaction being usually between ca. 30 minutes and 5 hours. In order to ensure the solution of the starting material, and/or to avoid the precipitation of the intermediates, acetic acid is optionally added to the reaction mixture, so that the resulting mixture ratio: concentrated sulphuric acid:water:acetic acid is, for example, 1:1:2. With higher sulphuric acid concentration, e.g. in ca. 90% sulphuric acid, ring closure with compounds of the below given General Formulae IIa, IIb and IIc, which require no decarboxylation, can be performed also at lower temperatures, i.e. from room temperature upwards. A further suitable acid condensation agent is, e.g. polyphorphoric acid, whereby the reaction conditions remain otherwise the same.

Suitable initial products for the process according to the invention which are converted by acid hydrolysis, i.e. in situ under the reaction conditions necessary for ring closure, into starting materials of the General Formula II are, in particular, those of the General Formulae IIa, IIb and IIc:

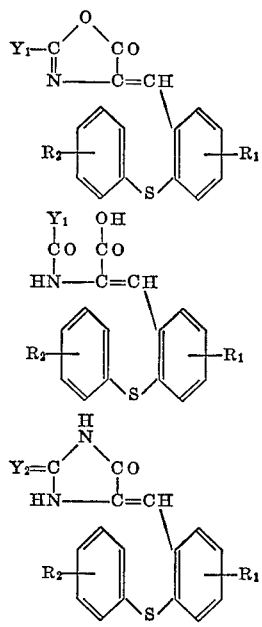

wherein $Y_1$ represents the phenyl group or a lower alkyl group, especially the methyl group, and $Y_2$ represents oxygen or sulphur, and $R_1$ and $R_2$ have the meanings given under Formula I.

Suitable initial products which are converted by acid hydrolysis and decarboxylation into starting materials of the General Formula II are, in particular, those of the General Formula IId:

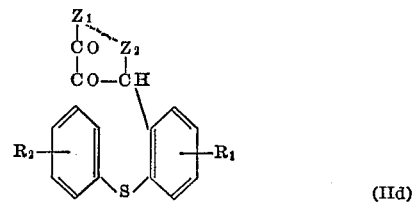

(IId)

wherein $Z_1$ represents the hydroxyl group, a lower alkoxy group, or an imino group linked with a carbonyl group $Z_2$ to form the grouping —NH—CO—, and $Z_2$ represents the cyano group, the carbamoyl group, a lower alkoxycarbonyl group, or a carbonyl group linked with an imino group $Z_1$, and $R_1$ and $R_2$ have the meanings given under Formula I.

The initial products of the General Formula IId are converted likewise in situ into starting materials of the General Formula II, provided that the ring closure is performed in an acid medium at temperatures of at least ca. 100° C.

The initial products of the General Formulae IIa, IIb and IIc, and also the starting materials of the General Formula II themselves, can be produced, for their part, from the likewise new o-(phenylthio)-benzaldehyde and its derivatives substituted corresponding to the definition for $R_1$ and $R_2$. By condensation of the stated aldehydes with hippuric acid or aceturic acid in acetic anhydride, in the presence of anhdyrous sodium acetate or potassium bicarbonate, are firstly obtained azlactones of the General Formula IIa, wherein $Y_1$ is a phenyl or methyl group. Instead of isolating the azlactones from the reaction mixture in the usual manner, e.g. by concentration by evaporation or by allowing crystallization to occur, it is also possible to add to the reaction mixture an amount of water measured to suit the subsequent ring closure reaction, and to accelerate hydrolysis of the acetic anhydride by moderate heating. After completed hydrolysis, concentrated sulphuric acid is added in an amount which corresponds to that of the mixture ratio of sulphuric acid, water and acetic acid which is favorable for ring closure, and ring closure performed preferably by heating of the reaction mixture to obtain refluxing. On the other hand, it is also possible either to convert the separated and optionally purified azlactones of the General Formula IIa in the same manner direct into the desired carboxylic acids of the General Formula III, or to convert them initially by acid hydrolysis under milder conditions into compounds of the General Formula IIb, or into optionally substituted [o-(phenylthio)-phenyl]-pyruvic acids of the General Formula II, and to perform ring closure with these compounds. The initial products of the General Formula IIb are obtained from the azlactones of the General Formula IIa having a phenyl group as $Y_1$ by partial hdyrolysis, especially by heating with highly diluted sulphuric acid in acetic acid, e.g. with sulphuric acid:water:acetic acid in the volume ratio of 1:10:30, to 100° C. The [o-phenylthio)-phenyl]-pyruvic acids of the General Formula II are obtained from the azlactones of the General Formula IIa by the refluxing of the latter with a mixture of dilute hydrochloric acid and acetic acid, e.g. with concentrated hydrochloric acid:water: acetic acid in the volume ratio of 1:2:4.

A comparison of the various process variants and their preliminary stages, i.e. of the reaction sequences starting with the common initial products o-(phenylthio)-benzaldehyde and its substitution products and hippuric acid, shows that the variant without isolation of the azlactones IIa and the variant with isolation thereof, with account being taken of the more simple procedure, on the one hand, and of the somewhat higher total yield and purity, on the other hand, are approximately equivalent, i.e. under certain circumstances the isolation of IIa is worth while. Opposed to this is the fact that the additional reaction steps of the conversion of IIa into IIb or into II scarcely constitute advantages with respect to the overall reaction sequence.

Initial products of the General Formula IIc are obtained, for example, by the boiling of o-(phenylthio)-benzaldehyde optionally substituted according to the definition for $R_1$ and $R_2$ with hydantoin in acetic acid in the presence of sodium acetate and a little acetic anhydride, or with 2-thiohydantoin in acetic acid in the presence of sodium acetate. As already mentioned, o-(phenylthio)-benzaldehyde and its derivatives substituted as defined are likewise new substances, which can be produced, e.g. by the reaction of optionally substituted o-halogenobenzaldehydes, such as o-chlorobenzaldehyde, with the in-situ-formed sodium or potassium salts of optionally substituted thiophenol in hexamethyl phosphoric acid triamide or dimethylformamide at 80–100° C.

Initial products of the General Formula IId having a lower alkoxy group as $Z_1$, and the cyano group as $Z_2$, are obtainable, e.g. by condensation of [o-(phenylthio)-phenyl]-acetonitrile, or of its derivatives substituted according to the definition for $R_1$ and $R_2$, with lower oxalic acid dialkylesters in an alkanolic, e.g. ethanolic, sodium methylate or sodium ethylate solution. If hydrogen chloride is fed into an alkoholic, e.g. ethanolic, solution of the stated condensation products at boiling temperature, then the initial products of the General Formula IId are obained wherein $Z_1$ and $Z_2$ together represent the group —NH—CO—. On boiling of the above-mentioned condensation products with mixtures of dilute sulphuric acid and acetic acid, e.g. with a mixture of concentrated sulphuric acid:acetic acid:water in a volume ratio of 1:5:3, [o-(phenylthio)-phenyl]-pyruvic acids of the General Formula II are obtained besides a similarly large proportion of initial products of the General Formula IId having the grouping —NH—CO— as the radical $Z_1$–$Z_2$. Of the [o-(phenylthio)-phenyl]-acetonitriles required for condensation with oxalic acid dialkyl esters, the unsubstituted nitrile and its production by reduction of o-(phenylthio)-benzoic acid—which, for its part, is obtained by reaction of o-chlorobenzoic acid with sodium-thiophenolate according to I. Goldberg, Berichte d Deutsch. Chem. Ges. (Reports of the German Chemical Society), 37, 4526 (1904)—or of its ethyl esters with lithium aluminium hydride, treatment of the obtained o-(phenylthio)benzyl alcohol with thionyl chloride in pyridine, and reaction of the obtained chloromethyl compound with sodium cyanide have been described by J. O. Jilek et al. in Monatsh. Chem., 96, 182–207, esp. 201 (1965). Of the derivatives substituted according to the definition for $R_1$ and $R_2$, some have been described by K. Pelz et al., Collect. Czech. Chem. Commun., 33, 1895–1910 (1968), and others can be produced analogously.

The reaction sequence for the production of compounds of the General Formula I which is based on the new final stage of the reduction of amides of the General Formula V, and on the production according to the invention of the carboxylic acids of the General Formula III, can be readily compared with the known reaction sequences proceeding by way of a ketone of the General Formula VI, because the initial products in both cases are identical or very similar. From the [o-(phenylthio)-phenyl]-acetonitriles mentioned in the preceding paragraph are obtained according to J. O. Jilek et al., loc. cit., in two stages, i.e. by hydrolysis and subsequent ring closure with polyphosphoric acid, the ketones of the General Formula VI, from which can be produced, by known processes, by way of 4 stages the final products of the General Formula I. In the same way, a series of, in all, 6 stages, namely oxalylation, ring closure to carboxylic acid, conversion into the acid chloride, formation of an amide and, finally, reduction thereof, leads, according to the new reaction sequence, from the [o-(phenylthio)-phenyl]-acetonitriles to the final products of the General Formula I. The other variants of the new reaction sequence are, however, appreciably shorter: In the case of these variants, o-chlorobenzaldehyde, or an o-chlorobenzaldehyde substituted according to the definition for $R_2$, is reacted with a sodium-thiophenolate optionally substituted according to the definition for $R_1$ to give an o-(phenylthio)-benzaldehyde, from which is obtained according to the invention, in a one- to three-stage reaction, a carboxylic acid of the General Formula III, and from this by way of the already mentioned three stages, hence 5 to 7 stages in all, the desired final product of the General Formula I. On the other hand, according to J. Goldberg, loc. cit. and J. O. Jilek et al., loc. cit., four stages are required to proceed from o-chlorobenzoic acid to [o-(phenylthio)- phenyl]-acetonitrile, and thus 10 stages, in all, to arrive at the end products of the General Formula I. o-Chlorobenzoic acid is indeed somewhat more easily accessible than o-chlorobenzaldehyde, but this advantage of o-chlorobenzoic acid is cancelled out by the reduction of the carboxyl group with lithium aluminium hydride already necessary as the second stage, whereas with the new reaction sequence a reduction by means of a complex hydride occurs only as the last stage. The advance in the art constituted by the various variants of the reaction sequence according to the invention consists already in the elimination of the Grignard reaction; in addition to this there is achieved, in most cases, a considerable reduction in the number of stages of the process.

The carboxylic acids of the General Formula III required as intermediates can be produced also by a second process which is characterized in that a functional derivative of such a carboxylic acid is hydrolyzed. Suitable functional derivatives of carboxylic acids of the General Formula I are, in particular, their nitriles, as well as their amides, imidoesters and esters, especially lower imidoalkyl esters and lower alkylesters. The hydrolysis is performed e.g. by the boiling of the functional derivatives of carboxylic acids of the General Formula III, e.g. in a mixture of mineral acids, and water, e.g. in equal parts by volume of 50% sulphuric acid and acetic acid, or in a mixture of 6 N hydrochloric acid and acetic acid. The hydrolysis can also be performed in alkaline medium, e.g. by boiling in alkanolic or alkanolic-aqueous alkali hydroxide solutions, e.g. by boiling in ethanolic or butanolic potassium hydroxide solution. This procedure is particularly suitable for the hydrolysis of lower imidoalkyl esters and alkyl esters. From the thereby directly obtained alkali metal salts, it is possible, optionally, to liberate in the usual manner the carboxylic acids of the General Formula III.

The nitriles of carboxylic acids of the General Formula III required as starting materials are obtained, e.g. by the reaction of 10-bromodibenzo[b,f]thiepin optionally substituted according to the definition for $R_1$ and $R_2$ with copper(I)-cyanide in dimethylformamide at its boiling temperature. 10-bromodibenzo[b,f]thiepin is described in the literature, cp. J. O. Jilek et al., Collect. Czech. Chem. Commun., 32, 3186–3212, esp. 3209 (1967); derivatives substituted according to definition can be produced analogously. A further reaction sequence for the production of the nitriles corresponding to the carboxylic acids of the General Formula III consists in the condensation of the already mentioned, prior known [o-(phenylthio)-phenyl]- acetonitrile and its derivatives substituted according to the definition for $R_1$ and $R_2$ with lower formic acid alkyl esters in low-alkanolic solutions of lower alkali metal alkanolates to obtain [o-(phenylthio)-phenyl]-malonaldehydronitriles, and the subsequent ring closure reaction in an acid medium, e.g. in polyphosphoric acid or trifluoroacetic acid. If ring closure is performed in ca. 90% sulphuric acid at room temperature with a reaction time of preferably 1-3 days, the corresponding amide is obtained in good yield. This can be either firstly isolated, or it can be hydrolyzed direct to the corresponding carboxylic acid of the General Formula III by dilution of the reaction mixture with water to obtain a sulphuric acid concentration of ca. 50%, and addition of acetic acid to the extent of doubling the volume, and subsequent heating. The amides corresponding to the nitriles can also be produced, e.g. from these by partial hydrolysis. Lower imidoalkyl esters of carboxylic acids of the General Formula III, or their hydrochlorides, are obtained, e.g. with the action of hydrogen chloride on absolute-alkanolic, e.g. methanolic or ethanolic, solutions of the corresponding nitriles. The imidoalkyl-ester-hydrochlorides can be hydrolyzed either directly in an acid medium, or in the, at least, double-molar amount of an alkanolic alkali hydroxide solution, to the corresponding carboxylic acids or their alkali salts, or firstly converted by heating in an aqueous-organic medium, e.g. in hydrous dioxane, methanol or ethanol, into the corresponding alkyl esters, and these then hydrolyzed according to the process, in alkaline or acid medium, to obtain the carboxylic acids of the General Formula III or their alkali salts.

According to a third process, the carboxylic acids of the General Formula III, and their salts with inorganic and organic bases, are produced by the reaction of a Grignard compound of the General Formula IIe:

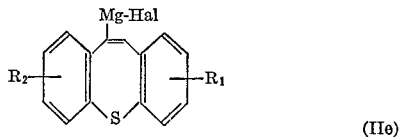

(IIe)

wherein

Hal represents halogen, preferably bromine, also iodine or chlorine, and $R_1$ and $R_2$ have the meanings given under Formula I, in the presence of an ethereal solvent, with carbon dioxide. The production of the Grignard compounds of the General Formula IIe and their reaction can be effected in the usual manner by the reaction, in the first place, of the 10-halogen-dibenzo[b,f]thiepins on which the compounds of the General Formula IIe are based, such as, e.g. the aforementioned, prior known 10-bromodibenzo[b,f]thiepin and its substitution products as defined, in an ethereal solvent, such as, e.g. tetrahydrofuran, diethyl ether or dibutyl ether, with magnesium chips, the reaction being initiated with small amounts of a reactive halide, such as, e.g. methyl iodide. Carbon dioxide is fed into the formed solution of the Grignard-compound at a temperature of between 0° and the boiling point of the solvent, preferably at room temperature; and, after completed reaction, the reaction mixture carefully decomposed, e.g. with highly diluted hydrochloric acid. Optionally, it is also possible, after the formation of the Grignard-compound, to distill off a large part of the ethereal solvent, and to replace it by another inert solvent, such as, e.g. benzene or toluene.

The carboxylic acids of the General Formula III are valuable not only because they are suitable for use as intermediates for production of compounds of the General Formula I, and for further pharmocological active substances, particularly psychopharmacological agents, but also because they and their salts with inorganic and organic bases themselves possess valuable pharmacological properties, especially anti-inflammatory activity. At the same time, the gastrointestinal compatibility of the carboxylic acids of the General Formula III, and of their pharmaceutically acceptable salts, is good, and the toxicity very low; so the therapeutic index also is very favorable. The anti-inflammatory activity of the new substances, e.g. of dibenzo[b.f]thiepin-10-carboxylic acid and its salts, can be determined, e.g. after oral administration to rats in the bolus alba oedema test according to G. Wilhelmi, Jap. J. Pharmacol, 15, 187 (1965). The pharmacological properties characteristize the carboxylic acids and their salts as active substances for pharmaceutical compositions which can be administered orally, rectally or parenterally for the treatment of rheumatic, arthritic and other inflammatory diseases. Of special importance is the unsubstituted dibenzo[b,f]thiepin-10-carboxylic acid, also 8-methoxydibenzo[b,f]thiepin-10-carboxylic acid.

Since, in place of the free carboxylic acids of the General Formula III, also the salts of these are suitable as active substances, a carboxylic acid of the General Formula III produced by application of one of the three aforementioned processes is, optionally, converted into a salt with an organic or organic base. Suitable salts of the new carboxylic acids for therapeutical application are those with pharmacologically safe inorganic and organic bases, i.e. with bases which exhibit, in the dosage amounts concerned, no physiological inherent effect, or which have a desired action, e.g. in the case of parenteral forms of administration, a local-anaesthetic action. Suitable salts are, e.g. sodium, potassium, lithium, magnesium, calcium and ammonium salts, as well as salts with ethylamine, triethylamine, 2-aminoethanol, 2,2'-iminodiethanol, 2-(dimethylamino)-ethanol, 2-(diethylamino)-ethanol, ethylenediamine, benzylamine, p-aminobenzoic acid-2-diethylaminoethyl ester (procaine), pyrrolidine, piperidine, morpholine, 1-ethyl-piperidine, 2-piperidino-ethanol or piperazine, or salts with basic ion-exchangers. The salts are produced in a manner known per se, e.g. by neutralization of organic solutions of carboxylic acids of the General Formula III with inorganic bases, or by the addition of equivalent amounts of organic bases, and subsequent concentration by evaporation.

The new carboxylic acids of the General Formula III, and their salts with inorganic and organic bases, can be administered, as already mentioned, orally, rectally or parenterally, particularly intramuscularly. They can, however, also be administered externally, e.g. they can be worked into ointment bases, or applied as lotions.

The daily dosages to be taken internally of compounds of the General Formula III, or of pharmacologically safe salts thereof, for the treatment of rheumatic, arthritic and other inflammatory diseases, as well as for the relief of pain, are between 1 and 30 mg./kg., preferably between 5 and 25 mg./kg., for mammals. Suitable dosage units, such as dragées, tablets, suppositories or ampoules, preferably contain 25-500 mg. of a compound of the General Formula III, or of a pharmacologically safe salt.

Dosage units for oral administration contain as active substance between 10% and 90% of a compound of the General Formula III, or of a pharmacologically safe salt thereof. They are produced by combining the active substances with, e.g. solid pulverlent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate, or polyethylene glycols of suitable molecular weights, to form tablets or dragée cores. The last-mentioned are coated, e.g. with concentrated sugar solutions which can also contain, e.g. gum arabic, talcum and/or titanium dioxide; or they are coated with a lacquer dissolved in readily volatile organic solvents or solvent mixtures. To these coatings can also be added dyestuffs, e.g. for identification of the various dosages of active substance.

The following directions further illustrate the production of tablets and dragées:

(a) An amount of 1000 g. of dibenzo[b,f]thiepin-10-carboxylic acid is mixed with 550 g. of lactose and 292 g. of potato starch; the mixture is then moistened with an alcoholic solution of 8 g. of gelatine, and granulated through a sieve. After drying of the granulate, 60 g. of potato starch, 60 g. of talcum, 10 g. of magnesium stearate and 20 g. of colloidal silicon dioxide are mixed in, and the mixture is pressed out to obtain 10,000 tablets each weighing 200 mg. and each containing 100 mg. of active substance. If required, the tablets can be provided with grooves to facilitate a more accurate adjustment of the dosage amount.

(b) An amount of 200 g. of dibenzo[b,f]thiepin-10-carboxylic acid is well mixed with 16 g. of maize starch and 6 g. of colloidal silicon dioxide; the mixture is then moistened with a solution of 2 g. of stearic acid, 6 g. of ethyl cellulose and 6 g. of stearin in ca. 70 ml. of isopropyl alcohol, and subsequently granulated through a sieve III (Ph. Helv. V). The granulate is dried for ca. 14 hours, and then put through sieve III–IIa. The sieved granulate is thereupon mixed with 16 g. of maize starch 16 g. of talcum and 2 g. of magnesium stearate, and the mixture pressed out to obtain 1000 dragée cores. These are coated with a concentrated syrup of 2 g. of lacca, 7.5 g. of gum arabic, 0.150 g. of dyestuff, 2 g. of highly dispersed silicon dioxide, 25 g. of talcum and 53.350 g. of sugar, and the coated dragées then dried. The obtained dragées each weigh 360 mg. and each contain 200 mg. of active substance.

Suitable dosage units for rectal administration are, e.g. suppositories consisting of a combination of a carboxylic acid of the General Formula III, or of a suitable salt thereof, with a neutral fatty base; or gelatine rectal capsules containing a combination of a carboxylic acid of the General Formula III, or of a suitable salt thereof, with polyethylene glycols.

Ampoules for parenteral administration, especially intramuscular administration, preferably contain a water-soluble salt, e.g. the sodium salt, of a carboxylic acid of the General Formula I, in a concentration of preferably 0.5–10%, optionally together with suitable stabilizing agents and buffer substances in aqueous solution.

The following examples further illustrate the carrying out of the processes according to the invention; the given examples, however, in no way limit the scope of the invention. The temperatures are expressed in degrees centigrade; all reactions are preferably performed in a nitrogen atmosphere.

EXAMPLE 1

An amount of 2.72 g. (0.001 mole) of [o-(phenylthio)-phenyl]-pyruvic acid is dissolved in 27 ml. of glacial acetic acid with heating; to this solution are firstly added 13.5 ml. of water and then dropwise, with stirring, 13.5 ml. of concentrated sulphuric acid; the obtained suspension is afterwards refluxed for 1½ hours at a bath temperature of 130–140°. The starting material goes into solution within ca. 5 minutes. The reaction solution is thereupon allowed to cool whilst stirring continues; the reaction product which has crystallized out is filtered off under suction, washed with ice-cold 50% acetic acid and with a large amount of water, and dried until its weight remains constant. Dibenzo[b,f]thiepin-10-carboxylic acid is obtained as light-yellow crystals, M.P. 200°. After recrystallization from acetone the melting point rises to 201–202°.

The starting material is produced as follows:

(a) To 32.0 ml. (34.5 g., 0.313 mole) of thiophenol are added 50 ml. of hexamethyl phosphoric acid triamide, whereupon heating occurs to ca. 40°. An addition is then made within a few minutes, with stirring, of a solution of 12.0 g. (0.3 mole) of sodium hydroxide in 20 ml. of water; the temperature rises in the process to ca. 70°. An amount of 34.0 ml. (42.3 g., 0.34 mole) of o-chlorobenzaldehyde is then added within 10 minutes to the warm solution; and the reaction solution, which is turning red, is heated with an oil-bath within 15 minutes to 95° (oil-bath temperature=115°). The reaction mixture is stirred at this temperature for 1¾ hours, whilst sodium chloride slowly precipitates from the reaction solution. Additions are thereupon made successively of a further 3.0 ml. (3.23 g., 0.031 mole) of thiophenol, 5.0 ml. of hexamethyl phosphoric acid triamide, and 4.0 ml. (0.03 mole) of 30% sodium hydroxide solution, stirring being continued for a further hour at 95°. After cooling of the mixture to 20°, it is diluted with 200 ml. of water, and the precipitating green oil is transferred together with the covering phase to a separating funnel; a further 100 ml. of water are added in the separating funnel, and the whole extracted with 200 ml. of benzene. The benzene layer absorbing the oily crude product is separated, and the aqueous phase subsequently extracted with 100 ml. of benzene. The combined benzene extracts are washed three times with 250 ml. of water each time, dried over sodium sulphate, and concentrated in vacuo at 70° bath temperature. The yellow oil remaining behind is inoculated, after cooling to room temperature, with crystallized end product, and allowed to stand for ca. 15 hours. The formed crystal cake is covered with 50 ml. of hexene, finely broken up, the crystal suspension cooled with ice and filtered off under suction; the crystals are washed with 30 ml. of ice-cold hexane and dried. In this manner is obtained o-(phenylthio)-benzaldehyde as yellow crystals, M.P. 48.5–50.5.

The product can, optionally, be recrystallized from hexane (0°) practically without loss, and melts then at 50–51°. It can moreover be distilled in high vacuum; B.P. 109–112°/0.004 torr.

(b) The mixture consisting of 16.05 g. (0.075 mole) of o-(phenylthio)-benzaldehyde, 18.8 g. (0.105 mole) of hippuric acid, 6.15 g. (0.075 mole) of anhydrous sodium acetate, and 75 ml. of acetic anhydride is stirred for 70 minutes in a bath at 85°. To the solid crystal mass, after it has cooled in an ice-bath, are added 75 ml. of water, and stirring is continued for an hour in the ice-bath; the crystals are then filtered off under suction, washed with 100 ml. of ice-cold 50% methanol, and finally dried. The obtained crude product, M.P. 109–115°, is recrystallized from chloroform/hexane to obtain 2-phenyl-4-[o-(phenylthio)benzylidene]-2-oxazolin - 5 - one, M.P. 116–120°. The mother-liquor residue is dissolved in 200 ml. of benzene/hexane (1:1); the solution is treated with 20 g. of silicagel Merck (diameter 0.05–0.2 mm.), filtered, and the filtrate concentrated in vacuo. Crystallization of the residue from chloroform/hexane yields a further amount of final product, M.P. 115–121°.

(c) A mixture consisting of 12.2 g. (0.034 mole) of 2-phenyl-4-[o-(phenylthio) - benzylidene] - 2 - oxazolin-5-one in 100 ml. of glacial acetic acid, 50 ml. of water and 25 ml. of concentrated hydrochloric acid is refluxed for 12 hours. After cooling, the reaction solution is decanted off from the dark resin, diluted with 200 ml. of water, and extracted with 250 ml. of ether. The ethereal extract is washed three times with water, dried over sodium sulphate, and concentrated in vacuo. The partially crystallizing oil remaining behind is crystallized from a methylene chloride/hexane mixture, and the obtained crystals are again recrystallized from ether/hexane (with addition of active charcoal), from chloroform, and finally from methylene chloride. [o - (Phenylthio) - phenyl]-pyruvic acid, M.P. 135–138°, crystallizes in the form of colorless flakes from the last-mentioned solvent.

EXAMPLE 2

Refluxing (bath temperature 140°) of 3.57 g. 0.01 mole) of 2-phenyl-4-[o-(phenylthio) - benzylidene] - 2-oxazolin-5-one (cp. Examples 1(a) and (b)] in a mixture of 10 ml. of glacial acetic acid, 5.0 ml. of water and 5.0 ml. of concentrated sulphuric acid is carried out for a period of 90 minutes. The reaction solution is allowed to cool and cooling continued in an ice-bath; the precipitated crystals are sharply filtered off under suction, washed with 20 ml. of ice-cold 50% acetic acid and a large amount of water, and dried until constant weight is obtained. Dibenzo[b,f]thiepin-10-carboxylic acid, M.P. 196.5–199°, is obtained after recrystallization from acetone. After repeated recrystallization, the melting point is 201–202°.

EXAMPLE 3

Dibenzo[b,f]thiepin - 10 - carboxylic acid is obtained, analogously to Example 2, starting with 2.95 g. (0.01 mole) of 2-methyl-4-[o-(phenylthio) - benzylidene] - 2-oxazolin-5-one.

The starting material is prepared as follows:

(a) 3.03 g. (0.01415 mole) of o-(phenylthio)-benzaldehyde [cp. Example 1(a)], 1.69 g. (0.01415 mole) of aceturic acid, 1.52 g. (0.0152 mole) of potassium bicarbonate and 5.0 ml. of acetic anhydride are stirred for 3 hours in a bath of 110°, and for 1½ hours at 120°. The brown reaction solution is completely concentrated in vacuo, the residue washed with 30 ml. of benzene, and the benzene solution, after filtration, applied to a column (prepared in benzene) of 200 g. of silica gel (Merck, 0.05–0.2 mm. particle-size). With benzene as the eluant, a by-product is firstly eluted, then unreacted aldehyde, and finally 2-methyl - 4 - [o - (phenylthio) - benzylidene]-2-oxazolin-5-one. This crystallizes, from ether/hexane, in the form of yellow crystals, M.P. 94°.

EXAMPLE 4

21.4 g. (0.10 mole) of o-(phenylthio)-benzaldehyde, 26.9 g. (0.15 mole) of hippuric acid (dried in vacuo at 100°) and 9.85 g. of sodium acetate (dried in vacuo at 150°) are placed in a flask provided with stirrer, reflux condenser, dropping funnel, calcium chloride tube, gas-inlet tube (for nitrogen) and thermometer, and covered with 100 ml. of acetic anhydride. Whilst stirring is maintained, the suspension is heated with an oil-bath to 86° (internal temperature). Four minutes after attainment of this temperature, a clear orange solution is obtained, which is stirred for a further 50 minutes at 80°. The solution is allowed to cool to 32°, and 50 ml. of water are then dried. The azlactone intermediate: 2-phenyl-4-[o-(phenylthio)-benzylidene]-2-oxazolin-5-one, precipitates initially in an oily form, but subsequently in crystalline form, and the temperature, by virtue of the energy being released with the hydrolysis of the excess acetic anhydride, increases within 15 minutes to ca. 80°. In order to complete the anhydride decomposition, the reaction mixture is immersed, 20 minutes after the addition of water, in a bath at 65°, stirred for a further 15 minutes at this temperature, and then cooled with an ice-bath to 20°.

To the obtained gold-yellow suspension of the azlactone are added dropwise, within 5 minutes, 50 ml. of concentrated sulphuric acid (96%). The temperature thereupon rises to 69°. The mixture is heated within 20 minutes, with an oil-bath at 150°, to the reflux temperature (119°), and the clear dark-red solution refluxed for 1¾ hours. The hot solution is inoculated with crystals of dibenzo[b,f]thiepin-10-carboxylic acid, and allowed to cool, without cooling, while stirring is maintained. After ¾ of an hour (internal temperature 35°), the solution is cooled with an ice-bath to 3°, and the fine crystal suspension well filtered off under suction. The crystals are washed three times with 20 ml. of ice-cold 50% acetic acid each time and a large amount of water, until a neutral reaction of the washing water is obtained, and dried in a water-bath (90°) in vacuo. Dibenzo[b,f]thiepin-10-carboxylic acid is obtained as yellowish crystals, M.P. 193–196°; after repeated recrystallization from acetone, M.P. 201–202°.

8-chlorodibenzo[b,f]thiepin-10-carboxylic acid is obtained in an analogous manner with the use of 24.85 g. (0.10 mole) of o-[(p-chlorophenyl)-thio]-benzaldehyde.

EXAMPLE 5

4.28 g. (0.020 mole) of o-(phenylthio)-benzaldehyde, 2.50 g. (0.0215 mole) of aceturic acid (N-acetylglycine), 1.87 g. (0.023 mole) of sodium acetate (anhydrous) and 20.0 ml. of acetic anhydride are stirred for one hour in a bath at 160°; a further 2.0 g. (0.017 mole) of aceturic acid are added and stirring continued for a further 15 minutes at 160°. After cooling, 10 ml. of water are added, the mixture is stirred for one minute in the same bath (160°), and cooled in an ice-bath.

To the above reaction mixture, which contains the formed 2-methyl-4-[o - (phenylthio)-benzylidene]-2-oxazolin-5-one (azlactone), are added 10.0 ml. of concentrated sulphuric acid, and refluxing is then carried out for a further 90 minutes. After the reaction mixture has been allowed to cool, it is diluted with 30 ml. of water and extracted with 30 ml. of methylene chloride. The organic phase is washed twice with 30 ml. of water each time; it is then extracted once with 20 ml. and once with 10 ml. of saturated sodium bicarbonate solution. The basic extracts treated with some active charcoal are acidified with concentrated hydrochloric acid. The precipitated crude product is taken up in ethyl acetate, the solution washed until neutral, dried over sodium sulphate, and concentrated in vacuo; the obtained crude dibenzo[b,f] thiepin-10-carboxylic acid is crystallized from ether/hexane and yellow crystals are thus obtained, M.P. 196–197°. After repeated recrystallization from acetone, the acid melts at 201–202°.

EXAMPLE 6

An amount of 3.75 g. (0.010 mole) of α-benzamido-o-(phenylthio)-cinnamic acid is dissolved, with heating, in 30 ml. of glacial acetic acid; to the solution are added 15 ml. of water and then dropwise, with stirring, 15 ml. of concentrated sulphuric acid; the formed suspension is thereupon refluxed for 2 hours (bath 130–140°). The hot solution is inoculated with crystallized dibenzo[b,f]thiepin-10-carboxylic acid, and allowed to cool with continued stirring. The crystals are filtered off under suction, washed with 30 ml. of ice-cold 50% acetic acid and with a large amount of water, and dried in vacuo until the weight remains constant. Dibenzo[b,f]thiepin-10-carboxylic acid is obtained as light-yellow crystals, M.P. 199–200°; after recrystallization from acetone or acetone/hexane; M.P. 201–202°.

The starting material is produced as follows:

(a) An amount of 5.0 g. (0.014 mole) of 2-phenyl-4-[o - (phenylthio)-benzylidene]-2-oxazolin-5-one [cp. Examples 1(a) and (b)] is dissolved warm in 30 ml. of glacial acetic acid; to the solution are added 10 ml. of water and 1.0 ml. of 2 N sulphuric acid, and stirring is maintained for 90 minutes in a bath at 100°. After cooling in an ice-bath, the precipitated crystals are filtered under suction, washed with 20 ml. of 50% ice-cold acetic acid and a large amount of water, and then dried. α-Benzamido-o-(phenylthio)-cinnamic acid is obtained as colorless crystals, M.P. 185–190°. Recrystallized from acetone/hexane, the substance melts at 188–190°.

EXAMPLE 7

An amount of 10.0 g. (0.0308 mole) of cyano-[o-(phenylthio)-phenyl]-pyruvic acid ethyl ester is dissolved in 75 ml. of glacial acetic acid; the solution is diluted with 37 ml. of water, cooled, and 37 ml. of concentrated sulphuric acid are slowly added. The reaction solution is refluxed for 2 hours, with stirring, with a bath temperature of 160°. On subsequent cooling, crystallization of the reaction product commences at ca. 70°. Whilst stirring is continued, the reaction mixture is allowed to cool to room temperature, whereupon 200 ml. of water are slowly added; the reaction mixture is cooled in an ice-bath to 8°, and then filtered under suction. The filter residue is washed until neutral and dried in an air-stream until the weight of the residue remains constant. For purification, it is then taken up in 200 ml. of 5% sodium bicarbonate solution and 50 ml. of ethyl acetate, and the whole shaken until two clear layers are formed. The phases are separated in a separating funnel, and the organic layer subsequently extracted a further three times with 30–40 ml. of half-saturated sodium bicarbonate solution. The combined bicarbonate extracts are carefully acidified with conc. hydrochloric acid in an ice-bath; and after 30 minutes' standing in the ice-bath, the crude acid which has crystallized out is filtered off under suction, washed neutral with water, and dried until constant weight is obtained. The obtained dibenzo[b,f]thiepin-10-carboxylic acid, M.P. 195–197°, can be recrystallized from acetone/hexane, whereupon the substance having the melting point 197–198° is obtained in the form of light-yellow needles, and, after repeated recrystallization from acetone, the pure substance having the melting point 201–202° is obtained.

The starting material is produced as follows:

(a) To the sodium ethylate solution prepared from 6.35 g. (0.276 gram atom) of sodium and 150 ml. of abs. ethanol are added all at once, at room temperature, 53.8 g. (0.234 mole) of [o-(phenylthio)-phenyl]-acetonitrile [cp. J. O. Jilek et al., Monatsh. Chem., 96, 182–207, especially 201 (1965)] and 40.0 g. (0.276 mole) of oxalic acid diethyl ester, the mixture being then stirred for 15 hours at room temperature. It is afterwards cooled with an ice-bath to 10°, and 125 ml. of 2 N hydrochloric acid are added whilst stirring is maintained. After the addition of a further 100 ml. of water, the main amount of ethanol is distilled off in a rotary evaporator. The yellow emulsion remaining behind is extracted twice with 300 ml. of ether each time; the combined extracts are washed with water, cooled with ice, and extracted with 150 ml. of ice-cold 2 N sodium hydroxide solution. The separated ether layer is washed with water, and the washing water added to the alkaline-aqueous phase. The latter is washed with ether, added to 170 ml. of 2 N hydrochloric acid and ice, and the precipitating product extracted twice with 300 ml. of ether each time. The ether extracts are dried over magnesium sulphate, and then completely evaporated in vacuo. The orange-yellow oil remaining behind crystallizes on standing. The crude product is taken up in 40 ml. of ether and 100 ml. of hexane, and the solution concentrated by evaporation at normal pressure; it is then inoculated and, after cooling, allowed to stand for 15 hours at 0°. The precipitated crystals are filtered under suction, washed with some hexane and dried. The thus obtained cyano-[o-(phenylthio)-phenyl]-pyruvic acid ethyl ester melts at 75–78°.

EXAMPLE 8

An amount of 2.68 g. (0.090 mole) of 3-[o-(phenylthio)-phenyl]-oxalacetimide is suspended in 20 ml. of glacial acetic acid, 10 ml. of water and 10 ml. of concentrated sulphuric acid; and the mixture refluxed for 2 hours. After cooling in an ice-bath, the crystals are filtered off under suction, washed with 20 ml. of ice-cold 50% acetic acid and a large amount of water, and dried to obtain constant weight. Dibenzo[b,f]thiepin-10-carboxylic acid is obtained as yellow needles, M.P. 195–198°. After repeated recrystallization from acetone, the substance melts at 201–202°.

The starting material is produced as follows:

(a) An amount of 10.0 g. (0.308 mole) of cyano-[o-(phenylthio)-phenyl]-pyruvic acid ethyl ester [cp. Example 7(a)] is dissolved in 70 ml. of ethanol (95%); and hydrochloric acid gas is fed for 90 minutes into the solution whilst it is being refluxed. The reaction solution is completely concentrated in vacuo; the oily residue is taken up in 50 ml. of methylene chloride, and extracted once with 200 ml. and once with 25 ml. of semi-saturated sodium bicarbonate solution. The combined bicarbonate extracts are shaken out with 50 ml. of methylene chloride, and acidified with concentrated hydrochloric acid. The product precipitating in oily form rapidly changes into crystal fragments. These are crushed, filtered off under suction, washed with a large amount of water, and dried in vacuo. 3-[o-(phenylthio)-phenyl]-oxalacetimide is thus obtained in the form of light-yellow crystals, M.P. 168–169°. Recrystallized from ethyl acetate/hexane, the product is obtained as yellow needles, M.P. 169–170°.

EXAMPLE 9

An amount of 3.153 g. (0.001 mole) of carbamoyl-[o-(phenylthio)-phenyl]-pyruvic acid is dissolved in 30 ml. of glacial acetic acid; to the solution are added 15 ml. of water and 15 ml. of concentrated sulphuric acid, and the whole is then refluxed for 2 hours. The still hot solution is inoculated and, with stirring, allowed to cool. The reaction product is filtered off under suction, washed with 50% acetic acid and water, and dried until its weight remains constant. The thus obtained dibenzo[b,f]thiepin-10-carboxylic acid melts at 199–200°, and after repeated recrystallization from acetone/hexane at 201–202°.

The starting material is produced as follows:

(a) An amount of 10.0 g. (0.00308 mole) of cyano-[o-(phenylthio)-phenyl]-pyruvic acid ethyl ester [cp. Example 7(a)] is dissolved in the course of 10 minutes, with stirring, in 120 ml. of 2 N sodium hydroxide solution; and the orange-colored solution allowed to stand for a further 20 minutes at room temperature. The pouring of the solution on to a mixture of 300 g. of ice and 50 ml. of hydrochloric acid causes the reaction product to precipitate in the form of fine yellow crystals. After a further 15 minutes' stirring, the precipitate is filtered off under suction, washed with water until neutral, stirred up three times with ether, and again filtered off with suction. After drying in vacuo at 30°, carbamoyl-[o-(phenylthio)-phenyl]-pyruvic acid is obtained in the form of almost colorless crystals, M.P. 121–122°.

The substance is sensitive to temperature and cannot be recrystallized.

EXAMPLE 10

An amount of 30.0 g. (0.0847 mole) of cyano-[o-[p-(methoxyphenyl)-thio]-phenyl]-pyruvic acid ethyl ester is dissolved in 225 ml. of glacial acetic acid at 50°; to the solution are added 112.5 ml. of water and the solution is cooled to 20°. Whilst stirring is maintained, 112.5 ml. of concentrated sulphuric acid are added dropwise within 5 minutes, in the course of which the temperature rises to 83°. The reaction mixture is subsequently heated to reflux temperature (internal temperature 117°) and refluxed for 2 hours. The red reaction solution is then allowed to cool and the reaction product crystallizes out. After dilution with 300 ml. of water (at 20° internal temperature) and renewed cooling with an ice-bath to 8°, the greenish crystals are filtered off under suction, washed with a large amount of water until neutral, and dried in an air-stream. The purification of the product is effected by the shaking of the crude product in a separating funnel with 400 ml. of ether and 400 ml. of semi-saturated sodium bicarbonate solution until two clear layers are formed. To obtain the complete removal of neutral by-products, the bicarbonate phase is extracted with 200 ml. of ether; the combined ethereal layers are again extracted with 30 ml. of saturated bicarbonate solution, and the combined aqueous phases carefully acidified with concentrated hydrochloric acid. The acid crystallizing out is filtered off under suction after cooling of the suspension with an ice-bath; the filtrate is washed with water, and dried in vacuo. In this manner is obtained 8-methoxy-dibenzo[b,f]thiepin-10-carboxylic acid in the form of pale yellow crystals, M.P. 227–234°. Recrystallized from acetone (0°), the acid melts at 235–237°.

The starting material is produced as follows:

(a) After dissolving 5.05 g. (0.22 gram atom) of sodium in 120 ml. of abs. ethanol, an addition is made at room temperature, with stirring, of 48.5 g. (0.19 mole) of [o - [p - (methoxyphenyl)-thio]-phenyl]-acetonitrile [cp. K. Pelz et al., Collect. Czech. Chem. Commun., 33, 1895–1910, especially 1906 (1968)] and 31.9 g. (0.22 mole) of oxalic acid diethyl ester. The initially cloudy solution becomes clear after 10 minutes, and the reaction product commences to precipitate after ca. one hour. After 18 hours' stirring at room temperature, the reaction mixture is cooled to 10°, and 110 ml. of 2 N hydrochloric acid are added. The major part of the ethanol is carefully distilled off in a rotary evaporator, the residue extracted twice with 250 ml. of ether each time, and the combined organic layers are washed with 200 ml. of ice water. The ether phase is then shaken with 300 g. of ice and 120 ml. of 2 N sodium hydroxide solution; the aqueous phase is separated and combined with the above-mentioned washing water. The aqueous-alkaline phase is then introduced into a mixture of 400 g. of ice and 140 ml. of 2 N hydrochloric acid. The reaction product precipitating in oily form is extracted by being shaken twice with 300 ml. of ether each time; the extract is dried over magnesium sulphate, and completely concentrated in vacuo. The obtained crude product is inoculated (see crystals produced by trituration of a specimen of the crude product with hexane), covered with 100 ml. of hexane, and stirred until crystallization is complete. The crushed crystal fragments are combined with the overlying hexane, boiled up and, with stirring, allowed to cool. After filtration under suction, washing twice with 50 ml. of hexane each time, and drying in vacuo, cyano-[o-[p-methoxyphenyl)-thio]-phenyl]-pyruvic acid ethyl ester is obtained in the form of pale yellow crystals, M.P. 114–117°.

EXAMPLE 11

The mixture of 4.0 g. (0.017 mole) of dibenzo[b,f]-thiepin-10-carbonitrile, 30 ml. of glacial acetic acid, 15 ml. of water and 15 ml. of concentrated sulphuric acid is refluxed for 7½ hours. The dibenzo[b,f]thiepin-10-carboxylic acid crystallizing out is filtered off under suction after cooling in an ice-bath; the obtained product is washed with 50% acetic acid and water, and then dried, whereby yellow crystals, M.P. 198–199°, are obtained; after repeated recrystallization from acetone, the M.P. is 201–202°. Dibenzo[b,f]thiepin-10-carboxamide, obtained as by-product, crystallizes from the filtrate after dilution with the washing water (ca. 200 ml.). After recrystallization from ethanol, the product is obtained in the form of yellowish crystals, M.P. 201–202°.

The starting material is produced as follows:

(a) The mixture of 20.0 g. (0.0692 mole) of 10-bromodibenzo[b,f]thiepin [cp. J. O. Jilek et al., Collect. Czech. Chem. Commun. 32, 3186–3212, esp. 3209 (1967)], 50 ml. of dimethylformamide and 6.82 g. (0.0762 mole) of copper(I)-cyanide is refluxed for 75 minutes, and the still warm suspension poured on to 1 kg. of ice. The dibenzo-[b,f]thiepin-10-carbonitrile, filtered off under suction together with the copper salts, is taken up in boiling benzene; and the solution, after cooling, is washed with 100 ml. of 6 N hydrochloric acid and 100 ml. of water. After drying over magnesium sulphate, and concentration of the solution in vacuo, the nitrile is obtained as light-yellow crystals. It crystallizes from ether/hexane in the form of light-yellow needles, M.P. 137–138°.

EXAMPLE 12

An amount of 2.53 g. (0.010 mole) of dibenzo[b,f]thiepin-10-carboxamide is refluxed in a mixture of 20 ml. of concentrated sulphuric acid, 20 ml. of water and 40 ml. of acetic acid for 24 hours. After inoculation and cooling, the precipitated crystals of dibenzo[b,f]thiepin-10-carboxylic acid are filtered off under suction, washed with 50% acetic acid and water, and finally dried, M.P. 199–200°; after recrystallization from acetone: M.P. 201–202°.

The starting material is produced as follows:

(a) After dissolving 1.89 g. (0.82 gram atom) of sodium in 40 ml. of abs. ethanol, an addition is made of 15.4 g. (0.0683 mole) of [o-(phenylthio)-phenyl]-acetonitrile [cp. J. O. Jilek et al., Monatsh. Chem. 96, 182–207, esp. 201 (1965)] and 7.14 ml. (0.082 mole) of formic acid ethyl ester; and the reaction mixture is then stirred for 7 hours at room temperature. For the purpose of dilution of the thick suspension, a further 20 ml. of ethanol is added 80 minutes after commencement of the reaction. The mixture is subsequently allowed to stand for 14 hours; it is then diluted with 250 ml. of ether, and the precipitated sodium salt of the reaction product filtered off under suction. The crystals, washed with ether, are suspended in 300 ml. of ether; the suspension is then shaken with ice and 50 ml. of 2 N hydrochloric acid, and the ether phase separated after the formation of clear layers. The aqueous layer is subsequently extracted with 100 ml. of ether; the combined ether extracts are washed twice with 200 ml. of water each time, dried over magnesium sulphate and concentrated in vacuo, whereupon a viscous yellowish oil remains behind. [o-(Phenylthio)-phenyl]-malonaldehydronitrile crystallizes from ether/hexane in the form of colorless crystals, M.P. 123–125°.

(b) The solution of 1.10 g. (0.00435 mole) of [o-(phenylthio)-phenyl]-malonaldehydonitrile in 20 ml. of 91% (w./w.) sulphuric acid is allowed to stand for 36 hours at room temperature; it is then poured, with stirring, on to 200 g. of ice. The crystallizing reaction product is filtered off under suction, and washed with water until neutral. For the purification and separation of a small amount of starting material, the crude product is dissolved in 100 ml. of ethyl acetate; the solution is washed with 10% sodium carbonate solution and water, and, after drying over magnesium sulphate, the solvent is evaporated off in vacuo. Dibenzo[b,f]thiepin-10-carboxamide is obtained in the form of colorless crystals, M.P. 201–202°.

The following is obtained in an analogous manner: starting with 17.42 g. (0.0683 mole) of [o-[(p-methoxyphenyl)-thio]-phenyl]-acetonitrile [cp. Collect. Czech. Chem. Commun., 33, 1906 (1968)] by way of [o-[(p-methoxyphenyl)-thio]-phenyl]-malonaldehydonitrile and 2-methoxydibenzo[b,f]thiepin-10-carboxamide: 2 - methoxydibenzo[b,f]thiepin-10-carboxylic acid; in an analogous manner is also obtained the following: starting with 17.69 g. (0.0683 mole) of [o-[(p-chlorophenyl)-thio]-phenyl]-acetonitrile [cp. loc. cit., 33, 1838 (1968)] by way of [o-[(p-chlorophenyl)-thio]-phenyl] - malonaldehydonitrile and 2-chlorodibenzo[b,f]thiepin-10-carboxamide: 2-chlorodibenzo[b,f]thiepin-10-carboxylic acid.

EXAMPLE 13

The solution of 1.10 g. (0.00435 mole) of [o-(phenylthio)-phenyl] - malonaldehydronitrile in 20 ml. of 91% (w./w.) of sulphuric acid is allowed to stand for 36 hours at room temperature. The thus obtained solution of dibenzo[b,f]thiepin-10-carboxamide [cp. Examples 12(a) and (b)] is carefully diluted with 40 ml. of acetic acid and 18 ml. of water, and the whole subsequently refluxed for 24 hours. After inoculation and cooling, dibenzo[b,f]thiepin-10-carboxylic acid crystallizes out. It is filtered off and washed with water, M.P. 199–200°; after recrystallization from acetone: M.P. 201–202°.

EXAMPLE 14

To 2.70 g. (0.110 gram atom) of magnesium chips and 50 ml. of abs. tetrahydrofuran are firstly added 0.62 ml. of methyl iodide, and after the reaction has commenced and within 30 minutes, a solution of 28.9 g. (0.100 mole) of 10-bromodibenzo[b,f]thiepin [cp. J. O. Jilek et al., Collect. Czech. Chem. Commun., 32, 3186–3212, esp. 3209 (1967)] in 80 ml. of abs. tetrahydrofuran is introduced. The reaction solution heats up to boiling. After cooling to 20°, a vigorous stream of dry carbon dioxide is fed into the solution, whereupon the temperature again rises and, finally, again falls. To the cooled reaction mixture are carefully added 300 ml. of water and 120 ml. of 2 N hydrochloric acid, and the reaction product is extracted with 300 ml. of ether. The aqueous layer is again extracted with 200 ml. of ether. The combined extracts are washed with water, and shaken out with 200 ml. of 0.5 N sodium hydroxide solution. The alkaline extract is acidified with concentrated hydrochloric acid, and the precipitating acid taken up in 300 ml. of ether. The acid aqueous phase is subsequently extracted with 200 ml. of ether; the ether layers are combined, washed until neutral, dried over magnesium sulphate, and concentrated in vacuo. Dibenzo[b,f]thiepin-10-carboxylic acid remains behind as yellow crystals. After recrystallization from acetone, they melt at 198–199°; after repeated recrystallization the melting point is 201–202°.

EXAMPLE 15

To a suspension being refluxed in a nitrogen atmosphere and consisting of 550 mg. of lithium aluminium hydride (73%, corresponding to 0.0106 mole) in 20 ml. of freshly prepared abs. ether is added dropwise in the course of 5 minutes, with stirring, a solution of 3.30 g. (0.01174 mole) of N,N-dimethyl-dibenzo[b,f]thiepin-10-carboxamide in 20 ml. of abs. benzene. The reaction mixture is refluxed for a further 20 minutes. It is then cooled with an ice-bath and additions are then made successively, with stirring, of 0.55 ml. water, 0.55 ml. of 2 N aqueous sodium hydroxide solution and 1.5 ml. of water. A granular precipitate has formed after a further 10 minutes' stirring in the ice-bath. An addition is then made of 2 g. of anhydrous sodium sulphate; stirring is continued for a few minutes, and the solid fractions are filtered off under suction. The suction-filter residue is washed with ether, the filtrate concentrated in vacuo, and the viscous residue crystallized from hexane. The crystals formed after ca. 14 hours' standing at 0° are filtered off, washed with a little pentane and dried, whereupon N,N-dimethyl-dibenzo[b,f]thiepin-10-methylamine, M.P. 112–114°, is obtained. Yield, together with a second crystal fraction, 2.96 g., 94.3% of the theoretical value. Melting point after recrystallization from petroleum ether=114–116°.

The N,N-dimethyl-dibenzo[b,f]thiepin-10-carboxamide required as starting material is produced as follows:

(a) An amount of 6.82 g. (0.0268 mole) of dibenzo[b,f]thiepin-10-carboxylic acid is refluxed in a mixture of 5.0 ml. (0.069 mole) of thionyl chloride and 50 ml. of abs. benzene for 90 minutes, whereby the stated acid goes into solution within a few minutes. The reaction solution is afterwards concentrated in vacuo, and the residue, to effect the complete removal of the thionyl chloride, dissolved in 20 ml. of abs. benzene; the solution is again concentrated in vacuo, whereupon 7.55 g. of crude dibenzo[b,f]thiepin-10-carboxylic acid chloride remain.

(b) To 10.0 ml. of a 41% aqueous dimethylamine solution is added dropwise in the course of 10 minutes, with ice-cooling, a solution of 7.55 g. of crude dibenzo[b,f]thiepin-10-carboxylic acid chloride in 35 ml. of methylene chloride. The reaction mixture is subsequently vigorously stirred in the ice-bath for a further 15 minutes, and an addition is then made of 10 ml. of water. The aqueous phase is separated, and the methylene chloride phase washed with water, dried over sodium sulphate, and concentrated in vacuo. N,N-dimethyl-dibenzo[b,f]thiepin-10-carboxamide remains behind in the form of yellowish crystals. These can be purified by washing with ether, in which the amide is practically insoluble, or by recrystallization from methylene chloride/hexane. In the last-mentioned case it is possible to obtain, in 3 fractions, a total of 7.15 g. of crystals, M.P. 145–146.5°. Yield relative to the employed carboxylic acid=95% of the theoretical amount.

EXAMPLE 16

Analogously to Example 15 are obtained, with use of the below stated carboxylic acid amdies and N-acyl derivatives of N-heterocycles, the amount of which is always 0.01174 mole, the correspondingly substituted dibenzo[b,f]thiepin-10-methylamines and N-(dibenzo[b,f]thiepin-10-ylmethyl)-derivatives of N-heterocycles, respectively:

from 3.0 g. of dibenzo[b,f] thiepin-10-carboxamide: dibenzo[b,f]thiepin-10-methylamine, hydrochloride hydrate M.P. 228–231°;
from 3.14 g. of N-methyl-dibenzo[b,f.]thiepin-10-carboxamide: N-methyl-dibenzo[b,f]thiepin-10-methylamine hydrochloride M.P. 234–237°;
from 3.63 g. of N,N-diethyl-dibenzo[b,f]thiepin-10-carboxamide: N,N-diethyl-dibenzo[b,f]thiepin-10-methylamine, hydrochloride M.P. 156–159° (from isopropanol);
from 3.60 g. of 1-(dibenzo[b,f]thiepin-10-ylcarbonyl)-pyrrolidine: 1-(dibenzo[b,f]thiepin-10-ylmethyl)-pyrrolidine, hydrochloride M.P. 237° (from abs. ethanol);
from 3.95 g. of 1-(dibenzo[b,f]thiepin-10-ylcarbonyl)-4-methylpiperazine: 1-(dibenzo[b,f]thiepin-10-ylmethyl)-4-methylpiperazine, dihydrochloride M.P. 225–228°;
from 3.71 g. of N,N-dimethyl-8-chlorodibenzo[b,f]thiepin-10-carboxamide: N,N-dimethyl-8-chlorodibenzo[b,f]thiepin-10-methylamine, M.P. 116° (from petroleum ether);
from 4.35 g. of 1-[(8-chlorodibenzo[b,f]thiepin-10-yl)-carbonyl]-4-methyl-piperazine: 1-[(8-chlorodibenzo[b,f]thiepin-10-yl)-methyl]-piperazine, M.P. 111–112° (from petroleum ether);
from 3.71 g. of N,N-dimethyl-2-chlorodibenzo[b,f]thiepin-10-carboxamide: N,N-dimethyl-2-chlorodibenzo[b,f]thiepin-10-methylamine, M.P. 76–77° (from petroleum ether);
from 4.18 g. 1-[(2-chlorodibenzo[b,f]thiepin-10-yl)-carbonyl]-piperidine: 1-[(2-chlorodibenzo[b,f]thiepin-10-yl)-methyl]-piperidine, M.P. 118° (from hexane).

The starting materials are produced from the corresponding carboxylic acids analogously to Examples 15(a) and (b).

The N-unsubstituted amide can also be obtained by ring-closure, according to Examples 12(a) and (b).

EXAMPLE 17

To the ice-cooled solution of 0.500 g. (0.00178 mole) of N,N-dimethyl-dibenzo[b,f]thiepin-10-carboxamide in 30 ml. of abs. benzene are added dropwise, with stirring, 10 ml. of a 3.47 molar solution of sodium-bis-(2-methoxyethoxy)-aluminium hydride (Redal®, trade name of the firm Aldrich) in benzene. The mixture is then stirred for 30 minutes at room temperature, and thereupon again cooled in the ice-bath. Excess reducing agent is decomposed by the careful addition of ice. After the addition of ether and water, the organic layer is separated, washed with water, and extracted with 3 portions each of 10 ml. of 1 N hydrochloric acid. The combined acid extracts are adjusted to pH 8 with sodium bicarbonate, and extracted three times with methylene chloride. The combined methylene chloride solutions are dried over potassium carbonate, filtered, and concentrated in vacuo. The residue is recrystallized from hexane to obtain N,N-dimethyl-dibenzo[b,f]thiepin-10-methylamine in the form of crystals, M.P. 113–115°. Yield 0.395 g., 84% of the theoretical amount.

EXAMPLE 18

A solution of 3.65 g. (0.01174 mole) of N,N-dimethyl-8-methoxydibenzo[b,f]thiepin-10-carboxamide in 20 ml. of abs. benzene is added dropwise within 10 minutes, with stirring, to a suspension being refluxed in a nitrogen atmosphere, the suspension consisting of 550 mg. of lithium aluminium hydride (73%, corresponding to 0.0106 mole) in 20 ml. of freshly prepared abs. ether. The reaction mixture is refluxed for a further 15 minutes, and then cooled with an ice-bath; successive additions are subsequently made to the cooled reaction mixture of 0.55 ml. of water, 0.55 ml. of 2 N aqueous sodium hydroxide solution and 1.5 ml. of water. After a further 10 minutes' stirring in the ice-bath there has formed a granular precipitate. An addition is then made of 2 g. of anhydrous magnesium sulphate; stirring is continued for 5 minutes, and the solid fractions are afterwards filtered off under suction. The filter residue is washed with ether, the filtrate is concentrated in vacuo, and the oily residue dissolved in 50 ml. of ether. The ether solution is firstly extracted with ca. 40 ml. of 1 N hydrochloric acid and then with ca. 40 ml. of 0.5 N hydrochloric acid. The combined acid extracts are rendered alkaline with 2 N sodium hydroxide solution, and the precipitated base obtained by three extractions each with 30 ml. of methylene chloride. The combined methylene chloride solutions are dried over magnesium sulphate, and concentrated in vacuo. The oil remaining behind is crystallized from double the weight of hexane, whereupon N,N-dimethyl-8-methoxydibenzo[b,f]thiepin-10-methylamine, M.P. 101–102°, is obtained. Yield in 2 crystal fractions=3.16 g., 90.5% of the theoretical amount.

The N,N-dimethyl-8-methoxydibenzo[b,f]thiepin-10-carboxamide required as starting material is produced as follows:

(a) An amount of 5.00 g. (0.0176 mole) of 8-methoxydibenzo[b,f]thiepin-10-carboxylic acid is refluxed in a mixture of 5.0 ml. (0.069 mole) of thionyl chloride and 50 ml. of abs. benzene for 90 minutes, in the course of which a clear solution is gradually formed. This is thereupon concentrated in vacuo and, for the complete removal of the thionyl chloride, the residue dissolved in 30 ml. of abs. benzene, and the solution again concentrated in vacuo, whereupon 5.50 g. of crude 8-methoxydibenzo[b,f]thiepin-10-carboxylic acid chloride remain behind.

(b) The solution of 5.50 g. of crude dibenzo[b,f]thiepin-10-carboxylic acid chloride in 30 ml. of methylene chloride is added dropwise in the course of 10 minutes, with ice-cooling, to 10.0 ml. of a 41% aqueous dimethylamine solution (0.080 mole). The reaction mixture is afterwards vigorously stirred in the ice-bath for a further 15 minutes, and 20 ml. of water are then added. The aqueous phase is separated, and subsequently extracted with methylene chloride. The combined methylene chloride phases are washed with water, dried over magnesium sulphate, and concentrated in vacuo. Crude N,N-dimethyl-8-methoxydibenzo[b,f]thiepin - 10 - carboxamide of a solid, glass-like consistency remains behind. For purification, the crude product is dissolved in 50 ml. of methylene chloride; the solution is extracted once with 10 ml. and once with 5 ml. of 2 N sodium hydroxide solution, dried over magnesium sulphate, and concentrated in vacuo. The obtained viscous oil is dissolved in ca. 30 ml. of warm ether, whereupon N,N-dimethyl-8-methoxydibenzo[b,f]thiepin - 10 - carboxamide crystallizes out. After cooling in the ice-bath, it is filtered off under suction, washed with a little hexane and then dried, M.P.=131–132°. Yield, including a second crystal fraction=5.19 g., 94.6% of the theoretical amount, relative to the employed acid.

EXAMPLE 19

Analogously to Example 18 are obtained, with the use of the below given carboxylic acid amides or N-acyl derivatives of N-heterocycles, the amount of which is always 0.01174 mole, the correspondingly substituted dibenzo[b,f]thiepin-10-methylamines and N-(dibenzo[b,f]thiepin-10-ylmethyl)-derivatives of N-heterocycles, respectively:

from 3.49 g. of N-methyl-8-methoxydibenzo[b,f]thiepin-10-carboxamide: N-methyl-8-methoxydibenzo[b,f]thiepin-10-methylamine, hydrochloride M.P. 216–218° (from abs. methanol);

from 4.30 g. of 1-[(8-methoxydibenzo[b,f]thiepin-10-yl)-carbonyl]-4-methyl-piperazine: 1-[(8-methoxydibenzo[b,f]thiepin-10-yl)-methyl]-4-methyl-piperazine, dihydrochloride M.P. 244–248° (from abs. ethanol);

from 3.49 g. of N-methyl-2-methoxydibenzo[b,f]thiepin-10-carboxamide: N-methyl-2-methoxydibenzo[b,f]thiepin-10-methylamine, hydrochloride M.P. 243–246°;

from 3.65 g. of N,N-dimethyl-2-methoxydibenzo[b,f]thiepin-10-carboxamide: N,N-dimethyl-2-methoxydibenzo[b,f]thiepin-10-methylamine, M.P. 95–96.5° (from hexane), hydrochloride M.P. 235–237°;

from 3.96 g. of 1-[(2-methoxydibenzo[b,f]thiepin-10-yl)-carbonyl]-pyrrolidine: 1-[(2-methoxydibenzo[b,f]thiepin-10-yl)-methyl]-pyrrolidine, hydrochloride M.P. 202–205° (from isopropanol/ether).

The starting materials are produced from the corresponding carboxylic acids analogously to Examples 18(a) and (b).

EXAMPLE 20

A suspension of 2.15 g. of lithium aluminum hydride in 120 ml. of abs. tetrahydrofuran is heated to the reflux temperature, whereupon a solution of 16.0 g. (0.056 mole) of N,N - dimethyldibenzo[b,f]thiepin-10-carboxamide in 100 ml. of abs. tetrahydrofuran is added dropwise, with stirring, during the course of 30 minutes; the reaction mixture is then refluxed for a further 90 minutes. It is afterwards cooled to 0° to 5°, and 2.13 ml. of water are then slowly added. To the obtained yellow suspension are added dropwise 2.13 ml. of 2 N sodium hydroxide solution followed by 7.3 ml. of water, stirring being continued for a further 10 minutes. An addition is then made of 10 g. of sodium sulphate and, after a brief stirring, the whole filtered. The filter residue is subsequently washed with 100 ml. of tetrahydrofuran, and the whole filterate concentrated in vacuo at 50° in a rotary evaporator. Whilst the oil remaining is still warm, an addition is made to it of ca. 50 ml. of hexane. The crystals of N,N - dimethyldibenzo[b,f]thiepin-10-methylamine, obtained after cooling, are filtered off under suction, and recrystallized from hexane and subsequently from petroleum ether, analogously to the procedure in Example 15; M.P. 114–116°.

A variant of this example consists in the addition to the initial lithium aluminum hydride suspension, whilst this is still cold (0°–5°), of 0.86 g. of aluminium chloride, with the procedure otherwise as described above.

What I claim is:

1. A dibenzo[b,f]thiepin-10-carboxylic acid of the Formula III

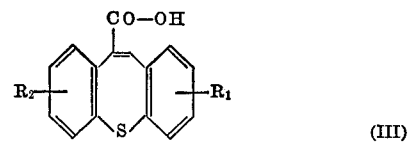

(III)

wherein $R_1$ and $R_2$ represent hydrogen, chlorine, bromine, trifluoromethyl, lower alkyl, lower alkoxy or lower alkylthio.

2. The compound according to claim 1 which is dibenzo[b,f]thiepin-10-carboxylic acid.

3. The compound according to claim 1 which is 8-methoxy dibenzo[b,f]thiepin-10-carboxylic acid.

References Cited

Lauden et al.: Chemical Abstracts, vol. 52, 8151–8154, May 1958.

HENRY R. JILES, Primary Examiner

C. M. S. JAISLE, Assistant Examiner

U.S. Cl. X.R.

260—240 R, 247.1, 268 TR, 293.57, 326 S, 326.5 SA, 326.81, 465 D, 470, 516; 424—248, 250, 267, 274, 275